United States Patent
Shi et al.

(10) Patent No.: US 8,559,519 B2
(45) Date of Patent: Oct. 15, 2013

(54) METHOD AND DEVICE FOR VIDEO ENCODING USING PREDICTED RESIDUALS

(75) Inventors: Xun Shi, Toronto (CA); Xiang Yu, Kitchener (CA); Dake He, Waterloo (CA); En-Hui Yang, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 365 days.

(21) Appl. No.: 12/684,461

(22) Filed: Jan. 8, 2010

(65) Prior Publication Data

US 2011/0170598 A1 Jul. 14, 2011

(51) Int. Cl.
*H04N 11/02* (2006.01)
*H04N 7/12* (2006.01)

(52) U.S. Cl.
USPC ............. 375/240.16; 375/240.12; 375/240.15

(58) Field of Classification Search
None
See application file for complete search history.

(56) References Cited

U.S. PATENT DOCUMENTS

| | | | |
|---|---|---|---|
| 5,646,686 A | 7/1997 | Pearlstein | |
| 6,084,908 A | 7/2000 | Chiang et al. | |
| 6,510,177 B1 * | 1/2003 | De Bonet et al. | 375/240.16 |
| 6,728,317 B1 | 4/2004 | Demos | |
| 7,526,027 B2 | 4/2009 | Sekiguchi | |
| 2002/0181579 A1 | 12/2002 | Vetro et al. | |
| 2003/0016751 A1 | 1/2003 | Vetro et al. | |
| 2003/0072374 A1 * | 4/2003 | Sohm | 375/240.16 |
| 2004/0202250 A1 | 10/2004 | Kong et al. | |
| 2005/0041740 A1 | 2/2005 | Sekiguchi | |
| 2005/0069210 A1 | 3/2005 | Tardif | |
| 2005/0175099 A1 | 8/2005 | Sarkijarvi et al. | |
| 2005/0265450 A1 * | 12/2005 | Raveendran et al. | 375/240.15 |
| 2006/0251330 A1 | 11/2006 | Toth et al. | |
| 2007/0029507 A1 | 2/2007 | Karel Steenbrink et al. | |
| 2007/0058713 A1 | 3/2007 | Shen et al. | |
| 2007/0133683 A1 | 6/2007 | Ohgose | |
| 2007/0171970 A1 * | 7/2007 | Song et al. | 375/240.02 |
| 2007/0217506 A1 | 9/2007 | Yang | |
| 2008/0013627 A1 | 1/2008 | Tahara et al. | |
| 2008/0056354 A1 | 3/2008 | Sun et al. | |
| 2008/0137741 A1 | 6/2008 | Kalva | |
| 2008/0212682 A1 | 9/2008 | Kalva | |
| 2008/0253457 A1 * | 10/2008 | Moore | 375/240.16 |
| 2008/0267294 A1 | 10/2008 | Fernandes | |
| 2008/0310513 A1 | 12/2008 | Ma et al. | |
| 2009/0097560 A1 | 4/2009 | Robertson | |
| 2009/0103622 A1 | 4/2009 | Tripathi et al. | |

(Continued)

OTHER PUBLICATIONS

Test Model Editing Committee: "Test Model 5", Coded Representation of Picture and Audio Information (ISO/IEC JTC1/SC29A/VG1 1 and ITU-T SG15 Q2), No. AVC-491b, N0400, Mar. 27, 1993, XP030000486.

(Continued)

*Primary Examiner* — Joseph Ustaris
*Assistant Examiner* — Frederick Bailey
(74) *Attorney, Agent, or Firm* — Rowand LLP

(57) ABSTRACT

An encoder for encoding a video by performing motion estimation using predicted residuals in the rate-distortion cost expression. The predicted residuals are determined by finding a predicted motion vector with respect to the original reference frame and calculating the corresponding residual values. The actual motion vector is then selected based on minimization of the rate-distortion cost expression with respect to the reconstructed reference frame, where the rate-distortion cost expression includes the predicted residuals. In particular, the cost expression includes reconstructed predicted residuals within the distortion term.

21 Claims, 5 Drawing Sheets

(56) References Cited

U.S. PATENT DOCUMENTS

| | | |
|---|---|---|
| 2009/0226102 A1 | 9/2009 | Huang et al. |
| 2010/0158126 A1* | 6/2010 | Bai et al. .................. 375/240.16 |
| 2011/0002554 A1 | 1/2011 | Uslubas et al. |
| 2011/0050991 A1 | 3/2011 | Bellers et al. |
| 2011/0122950 A1* | 5/2011 | Ji et al. ..................... 375/240.16 |
| 2011/0170595 A1 | 7/2011 | Shi |
| 2011/0292999 A1 | 12/2011 | Jeong et al. |

OTHER PUBLICATIONS

I. Ahmad, Xiaohui Wei, Yu Sun, and Ya-Qin Zhang. Video transcoding: an overview of various techniques and research issues. Multimedia, IEEE Transactions on, 7(5):793-804, 2005.

N. Bjork and C. Christopoulos, Transcoder architecture for video coding, Consumer Electron, IEEE Trans on, vol. 44, pp. 88-98, Feb. 1998.

I. Sylvester, Transcoding: The Future of the Video Market Depends on It, IDC Executive Brief Nov. 2006.

A. Vetro, C. Christopoulos, and H. Sun. Video transcoding architectures and techniques: an overview. Signal Processing Magazine, IEEE, 20(2): 18-29, 2003.

D. Marpe, T. Wiegand, and G J. Sullivan. Standards report—the h.264/mpeg4 advanced video coding standard and its applications. Communications Magazine, IEEE, 44(8): 134-143, 2006.

T. Wiegand, G. J. Sullivan, G. Bjntegaard, and A. Luthra. Overview of the h.264/avc video coding standard. Circuits and Systems for Video Technology, IEEE Transactions on, 13(7):560-576, 2003.

J. De Cock, S. Notebaert, K. Vermeirsch, P. Lambert and R. Van de Walle, Efficient spatial resolution reduction transcoding for H.264/AVC, ICIP 2008, pp. 1208-1211.

H. Shen, X. Sun, F. Wu, H. Li, and S. Li, A fast downsizing video transcoder for h.264/avc with rate-distortion optimal mode decision, ICME 2006, pp. 2017-2020.

H. Shen, X. Sun and F. Wu. Fast h.264/mpeg-4 ave transcoding power-spectrum-based rate-distortion optimization. Circuits and Systems for Video Technology, IEEE Transactions on., vol. 18, No. 6, pp. 746-755, 2008.

J. Wang, An efficient motion estimation method for h.264-based video transcoding with arbitrary spatial resolution conversion, Master's thesis. University of Waterloo, Canada, 2007.

P.Yin, A. Vetro, B. Liu, and H. Sun, Drift compensation for reduced spatial resolution transcoding: a summary, IEEE Trans. Circuits and Systems, vol. 4, No. 2, pp. 32-3 6, 2004.

P. Zhang, Y. Lu, Q. Huang and W. Gao, Mode mapping method for H.264/AVC spatial downscaling transcoding, ICIP 2004, pp. 2781-2784.

Steiger, O., "Adaptive Video Delivery Using Semantics", Thesis No. 3236 (2005), École Polytechnique Fédérale De Lausanne.

Samet, H., "Data Structures for Quadtree Approximation and Compression", Sep. 1985, Communications of the ACM, v.28, n. 9.

European Search Report, EP Application No. 10150318.3-1247, Aug. 5, 2010; 8 pgs.

Bo Shen et al: "Adaptive Motion-Vector Resampling for Compressed Video Downscaling" IEEE Transactions on Circuits and Systems for Video Technology, vol. 9, No. 6, Sep. 1, 1999, XP011014612.

Siu W C et al: "On the architecture of H.264 to H.264 homogeneous transcoding platform" International Conference on Neural Networks and Signal Processing, Jun. 7, 2008, pp. 654-659, XP031298782.

Dogan S et al: "Chapter 6: Video Transcoding for Inter-network Communications" Apr. 25, 2002, Compressed Video Communications, John Wiley & Sons Ltd. pp. 215-256, XP007913926.

Wong J W C et al: "Predictive motion estimation for reduced-resolution video from high-resolution compressed video" Proceedings of the International Conference on Image Processing (ICIP), vol. 2, Oct. 4, 1998, pp. 461-464, XP010308639.

European Search Report, EP Application No. 10150319.1-1247, Aug. 5, 2010, 6 pgs.

European Search Report, EP Application No. 10150321.1-1247, Aug. 5, 2010, 7 pgs.

Huifeng Shen et al: "A Fast Downsizing Video Transcoder for H.264/AVC with Rate-Distortion Optimal Mode Decision" IEEE International Conference on Multimedia and Expo, Jul. 1, 2006, pp. 2017-2020, XP031033261.

Jia-Jun Bu et al: "Fast mode decision algorithm for spatial resolutions down-scaling transcoding to H.264" Journal of Zhejiang University—Science A, vol. 7, No. 1, 27 Apr. 2006, pp. 70-75, XP019385075.

European Search Report, EP Application No. 10150328.2-1247, Aug. 5, 2010, 7 pgs.

Jan De Cock et al: "Dyadic spatial resolution reduction transcoding for H. 2641AVC" Multimedia Systems, Springer, Berlin, DE, vol. 16, No. 2, Jan. 7, 2010, pp. 139-149, XP0198804325.

En-Hui Yang et al: "Rate Distortion Optimization for H. 264 Interframe Coding: A General Framework and Algorithms" IEEE Transactions on Image Processing, IEEE Service Center, Piscataway, NJ, US LNKD-DOI:10.1109/TIP.2007, 896685, vol. 16, No. 7, Jul. 1, 2007, pp. 1774-1784, XP011185448.

Christopoulos C et al: Video transcoding architectures and techniques: an overview IEEE Signal Processing Magazine, IEEE Service Center, Piscataway, NJ, US LNKD-DOI:10, 1109/MSP, 2003, 1184336, vol. 20, No. 2, Mar. 1, 2003, pp. 18-29, XP011095789.

European Search Report, EP Application No. 10150329.0-1247, Aug. 5, 2010, 7 pgs.

Ligang Lu et al: "Adaptive frame prediction for foveation scalable video coding" Proceedings of the International Conference on Multimedia and Expo (ICME), Aug. 22, 2001, pp. 705-708, XP010661935.

Sullivan G J et al: "Rate-Distortion Optimization for Video Compression" IEEE Signal Processing Magazine, IEEE Service Center, Piscataway, NJ, US LNKD-DOI:10.1109/79.733497, vol. 15, No. 6, Nov. 1, 1998, pp. 74-90, XP011089821.

USPTO Office Action relating to U.S. Appl. No. 12/684,298 dated Aug. 9, 2012.

USPTO US Office Action, relating to U.S. Appl. No. 12/684,374 dated Aug. 6, 2012.

EPO, Invitation Pursuant to Article 94(3) and Rule 71(1) EPC relating to EP application No. 10150329.0 dated May 23, 2013.

* cited by examiner

METHOD AND DEVICE FOR VIDEO ENCODING USING PREDICTED RESIDUALS

FIELD

The present application generally relates to video encoding and, in particular, to rate-distortion cost optimization in the context of video encoding.

BACKGROUND

The current state-of-the-art for video encoding is the ITU-T H.264/AVC video coding standard. It defines a number of different profiles for different applications, including the Main profile, Baseline profile and others.

There are a number of standards for encoding/decoding images and videos, including H.264/AVC, that use block-based coding processes. In these processes, the image or frame is divided into blocks, typically 4×4 or 8×8 in pixels, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

The motion estimation process involved in inter-frame encoding relies upon a rate-distortion expression that only accounts for some aspects of the actual distortion and coding rate. In particular, it ignores distortion due to quantization of the residual values and the coding rate attributable to the quantized transformed residual values (the quantized transform domain coefficients). However, it would be computationally impractical for an encoder to determine these quantities for every candidate motion vector under evaluation during the encoding process in order to incorporate these quantities into the rate-distortion analysis.

It would be advantageous to provide for an encoder and methods or processes for encoding that improve rate-distortion performance.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
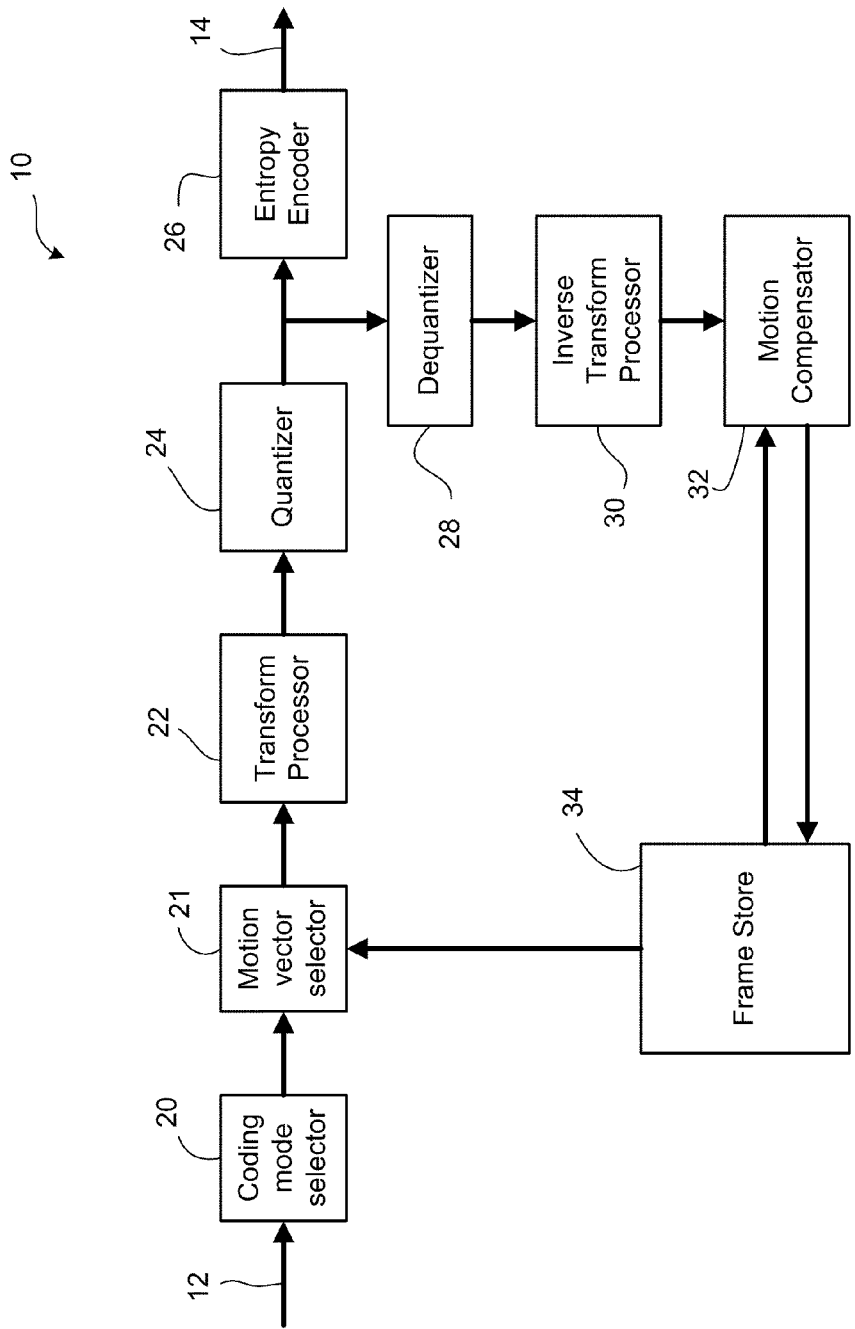
FIG. 1 shows, in block diagram form, an encoder for encoding video.

In one aspect, the present application describes a method of encoding a video, the video including a plurality of frames including a target frame and an original reference frame, the original reference frame having been encoded and decoded to produce a reconstructed reference frame stored in a frame store, the target frame including an inter-coded partition. The method includes selecting a predicted motion vector for the inter-coded partition; calculating predicted residual values from the difference between the inter-coded partition and a reference block in the original reference frame, wherein the reference block is identified by the predicted motion vector; and determining an actual motion vector with reference to the reconstructed reference frame using a rate-distortion expression incorporating the predicted residual values.

In another aspect, the present application describes an encoder for encoding a video, the video including a plurality of frames including a target frame and an original reference frame, the original reference frame having been encoded and decoded to produce a reconstructed reference frame, the target frame including an inter-coded partition. The encoder includes a processor; a memory storing the original reference frame and the reconstructed reference frame; a communications system for outputting an encoded video; and an encoding application stored in memory. The application contains instructions for configuring the processor to encode the video by selecting a predicted motion vector for the inter-coded partition; calculating predicted residual values from the difference between the inter-coded partition and a reference block in the original reference frame, wherein the reference block is identified by the predicted motion vector; and determining an actual motion vector with reference to the reconstructed reference frame using a rate-distortion expression incorporating the predicted residual values.

In another aspect, the present application describes a computer-readable medium storing computer-executable instructions that, when executed, configure a processor to execute the methods described herein.

Other aspects and features of the present application will be understood by those of ordinary skill in the art from a review of the following description of examples in conjunction with the accompanying figures.

In the description that follows, example embodiments are described with reference to the H.264/AVC standard. Those ordinarily skilled in the art will understand that the present application is not limited to H.264/AVC but may be applicable to other video coding/decoding standards.

In the description that follows, the terms frame and slice are used somewhat interchangeably. Those of skill in the art will appreciate that, in the case of the H.264/AVC standard, a frame may contain one or more slices. It will also be appreciated that certain encoding/decoding operations are performed on a frame-by-frame basis and some are performed on a slice-by-slice basis, depending on the particular requirements of the applicable video coding standard. In any particular embodiment, the applicable video coding standard may determine whether the operations described below are performed in connection with frames and/or slices, as the case may be. Accordingly, those ordinarily skilled in the art will understand, in light of the present disclosure, whether particular operations or processes described herein and particular references to frames, slices, or both for a given embodiment.

Figure 2:
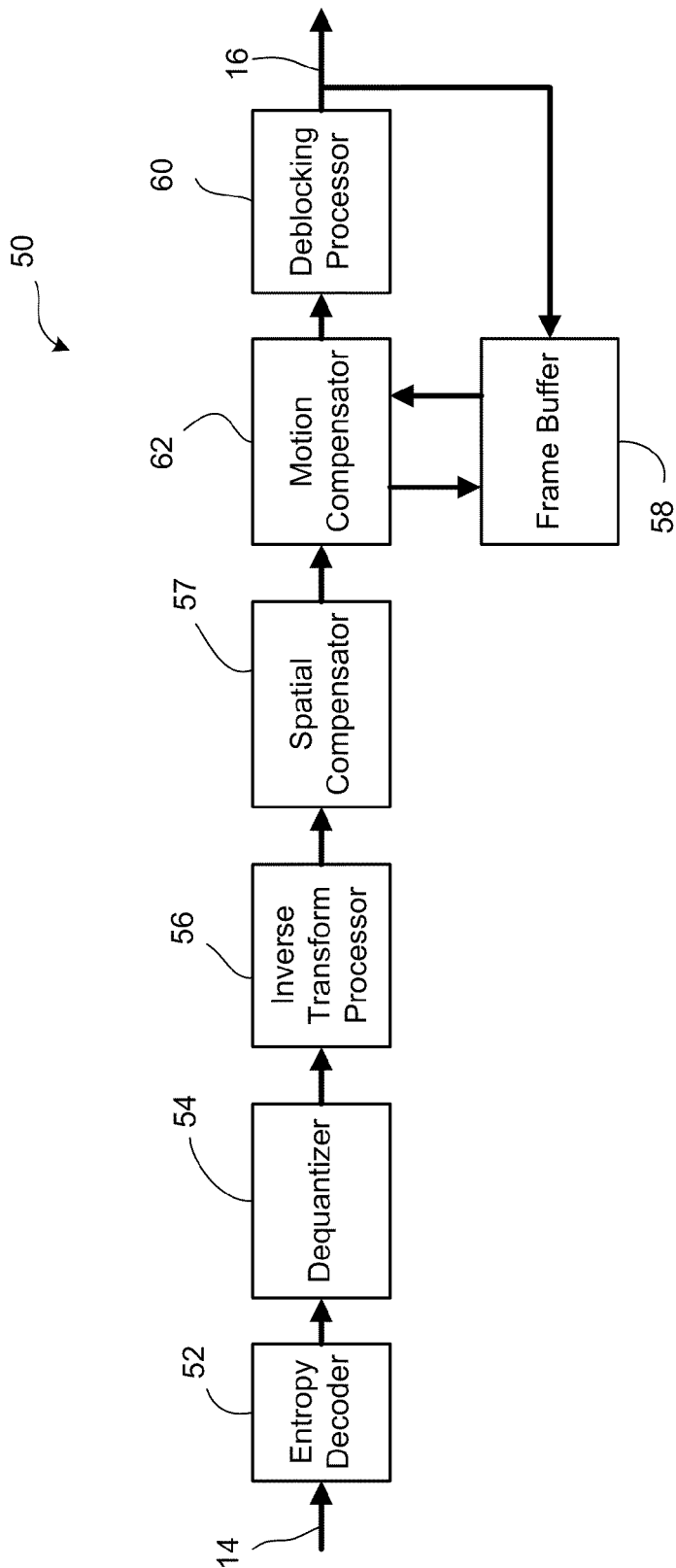
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard.

The encoder 10 includes a motion vector predictor 21, a coding mode selector 20, a transform processor 22, a quantizer 24, and an entropy encoder 26. As will be appreciated by those ordinarily skilled in the art, the coding mode selector 20 determines the appropriate coding mode for the video source, for example whether the subject frame/slice is of I, P, or B type. The transform processor 22 performs a transform upon the spatial domain data. For example, in many embodiments a discrete cosine transform (DCT) is used. The transform is performed on a macroblock or sub-block basis, depending on the configuration or the rate-distortion cost. In the H.264/AVC standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes.

The resulting transformed coefficient matrix for each block is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264/AVC, for example, prescribes nine spatial prediction modes for 4×4 transform blocks. In some embodiments, each of the nine modes may be used to independently process a block, and then rate-distortion optimization is used to select the best mode.

The H.264/AVC standard also prescribes the use of motion prediction/compensation to take advantage of temporal prediction, as indicated by the motion vector selector 21. Accordingly, the encoder 10 has a feedback loop that includes a de-quantizer 28, inverse transform processor 30, and motion compensator 32. These elements mirror the decoding process implemented by the decoder 50 to reproduce the frame/slice. A frame store 34 is used to store the reconstructed frames. In this manner, the motion prediction is based on what will be the reconstructed frames at the decoder 50 and not on the original frames 12, which may differ from the reconstructed frames due to the lossy compression involved in encoding/decoding. The feedback loop may include a deblocking processor in some embodiments (not illustrated).

The motion vector selector 21 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream associated with the quantized coefficients.

Those ordinarily skilled in the art will appreciate the details and possible variations for implementing H.264/AVC encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for using in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data" (i.e. residual data). It will be appreciated that, in some cases, such as with an intra-coded macroblock, the recreated "video data" is the residual data for use in spatial compensation relative to a previously decoded block within the frame. The spatial compensator 57 generates the actual video data from the residual data and pixel data from a previously decoded block. In other cases, such as inter-coded macroblocks, the recreated "video data" from the inverse transform processor 56 is the residual data for use in motion compensation relative to a reference block from a different frame.

The motion compensator 62 locates a reference block within the frame buffer 58, specified for a particular inter-coded macroblock. It does so based on the reference frame information and motion vector specified for the inter-coded macroblock (or a partition within the macroblock). It then supplies the reference block pixel data for combination with the residual data to arrive at the recreated video data for that macroblock/partition.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

R-D Cost Optimization in the Encoding Process

A compressed inter-predicted macroblock in H.264/AVC is decoded into a set of five components (m, Ref, v, u and q). m is the macroblock mode; also interchangeably called the coding mode or the partition mode. The luminance component of a macroblock can be partitioned into one of the following 7 modes with different partition sizes: 16×16, 8×16, 16×8, 8×8 and sub-partition modes 4×8, 8×4, 4×4. Ref is a vector containing the indices of reference frames, which are previously coded frames used as predictions to each partition. For the purposes of the discussion herein, the number of reference frames is assumed to be 1. In other words, the following discussion presumes motion estimation only on one previously encoded frame; however, it will be appreciated that the more general case may involve multiple frames. v are motion vectors, which are two-dimensional vectors storing the spatial offsets for each partition to its prediction in the reference frames. u refers to motion prediction residuals that are to be used to adjust the data in the reference frame indicated by the motion vector in order to reconstruct the data for the partition. q is the scalar quantization parameter.

In order to achieve the optimal coding performance measured by rate-distortion cost functions, a conventional encoder handles each inter-predicted macroblock with a brute-force time-consuming process. Two computationally expensive processes are employed: considering all candidate motion vectors within a certain range (motion estimation), and considering all possible macroblock modes (coding mode). Coding performance is measured by a rate-distortion cost function, which takes the form:

$$J = D + \lambda R \quad (1)$$

where distortion D refers to coding errors, and coding rate R is the number of bits spent to represent the coded macroblock. The quantity $\lambda$ is the Lagrangian multiplier, which is a function of the quantization parameter QP.

In the H.264/AVC reference codec, the cost function is carried out in motion estimation and mode decision based on somewhat different quantities. Motion estimation aims at searching for a spatial displacement (a motion vector) between current block and a location in the reference frame that leads to the minimum rate-distortion cost. This process is separately performed for each partition of a macroblock in frame i based on the minimization of:

$$J_{me\_min} = \min_{v_i} \|x_i - p_i(m_i, v_i, \overline{x_{i-1}})\| + \lambda r_{v_i} \quad (2)$$

over a certain search range. Distortion, in Equation (2), is the sum of differences between original pixels $x_i$ and their predictions $p_i$. The predictions $p_i$ are found based upon the reconstructed reference frame $\overline{x_{i-1}}$, and the specific block of the reconstructed reference frame pointed at by motion vector $v_i$ and at the specified macroblock mode $m_i$. The rate term, $r_{v_i}$, represents the rate, that is the number of bits in the output bitstream required to encode the motion vectors $v_i$. It will be understood that the nomenclature "i−1" to indicate the reference frame does not necessarily mean that the reference frame is the frame immediately preceding the current frame i in the video sequence, but rather that the reference frame is a frame previously encoded by the encoder.

It will be noted that Equation (2) does not reflect the real distortion and real coding rate. In fact, the real distortion comes from the integer rounding from quantization of the transform domain coefficients (TCOEFs) (also called the "residuals"), and the real coding rate includes both motion rate and texture rate. Those skilled in the art will appreciate that the cost function used in motion estimation is incomplete because residuals are undetermined at this stage. In order for the real rate-distortion cost to be evaluated at the motion estimation stage, it would require that the encoder calculate for each candidate motion vector the residuals, transform and quantize the predicted residuals, and then reconstruct the macroblock, after which the real cost can be measured. Such an implementation is impractical due to the high computational complexity. Therefore, the conventional encoder uses Equation (2) to approximate the real rate-distortion expenses when performing motion vector estimation.

During mode decision, since the residuals are more readily available, the rate-distortion cost function is capable of taking them into account. Accordingly, macroblock mode may be selected based on the minimization of:

$$J_{md\_min} = \min_{m_i} \|x_i - \overline{x_i}\| + \lambda r_{m_i, v_i, z_i} \quad (3)$$
$$= \min_{m_i} \|x_i - (p_i(m_i, v_i, \overline{x_{i-1}}) + z^{-1}z(u_i, q_i))\| + \lambda r_{m_i, v_i, z_i}$$

over all possible inter-coded macroblock modes. Equation (3) reflects the real distortion as shall be decoded in the decoder, which is the accumulated difference between original pixels $x_i$ and their reconstructions $\overline{x}_i$ over the whole macroblock. Reconstruction $\overline{x}_i$ is generated based on the macroblock prediction $p_i$ found in the reference frame as adjusted or modified by the reconstructed motion estimation residuals $z^{-1}z(u_i, q_i)$, where $u_i$ represents the residuals, $q_i$ is the quantization step size, z is the transformation and quantization process, and $z^{-1}$ represents the inverse process of z. Rate cost in this case also represents the real coding bits, which includes not only the motion rate $r_{m,v}$ but also the texture rate $r_z$. The "texture rate" is a term sometimes used to refer to the rate for encoding the quantized transform domain coefficients (TCOEFs).

It will be appreciated that the encoding process employs the above two cost functions at different stages. Equation (2) is first used to approximate the best motion vectors for a specific macroblock mode and Equation (3) is used later in the encoding process to select the optimal macroblock mode. It is easy to infer that if Equation (2) inaccurately locates a suitable motion vector, Equation (3) will be misled in selecting an optimal macroblock mode and this sub-optimal result will eventually impact overall coding performance.

In accordance with one aspect of the present application, it is noted that if the cost function for motion estimation can be compensated with accurate residual prediction, the overall encoding performance will be consistently improved.

Motion Estimation Using Original Reference Frames

The rate-distortion cost expression for selecting a motion vector represented by Equation (2) excludes distortion and rate information relating to residuals because it would be overly computationally demanding to calculate residuals, transform them, quantize them, de-quantize them, and inverse transform them for every candidate motion vector that is evaluated. Nevertheless, the present application discloses a process and encoder that employs predicted residuals in the motion vector selection process without the computational burden of determining the rate-distortion impact of actual residuals for every candidate motion vector.

In one aspect, the present application discloses a process in which the motion vector selection rate-distortion expression incorporates predicted reconstructed residual values (i.e. predicted residuals).

In one embodiment, the predicted residuals are obtained by selecting a predicted motion vector for a given partition and determining the predicted residuals using the predicted motion vector and the original reference frame, i.e. not the reconstructed reference frame in the frame store, but the original reference frame.

Consider that the determined motion vectors after regular motion estimation reflect the motion flows between the current to-be-encoded frame and the reference frame, which is the reconstruction of a previously encoded frame. In fact, these motion flows do not resemble the real motion of the video sequence, which should be determined between the current to-be-encoded frame and the original reference frame. The deviation between these two motion flows are caused by quantization operations during reconstruction of the reference frame. By using the original reference frame, propagated quantization errors are avoided.

The predicted motion vector identifies a predicted reference block within the original reference frame. The predicted residuals are determined from the difference between the predicted reference block and the to-be-encoded partition. In one sense, the predicted residuals give the encoder a set of "desired residuals" for a likely motion vector. The encoder then goes on to find an actual refined motion vector relative to the reconstructed reference frame that "best fits" the "desired residuals".

The selection of a "predicted motion vector" and the calculation of "predicted residuals" may be termed "pre-motion-estimation". Conceptually at least, the motion estimation is split into two stages. In the first stage, during pre-motion estimation, a predicted motion vector is selected and the resulting residuals from the predicted motion vector relative to the original reference frame are calculated. The selection of the predicted motion vector may use a rate-distortion expression. In the second stage, the actual motion vector is selected using rate-distortion analysis within a search area in the reconstructed reference frame, wherein the rate-distortion analysis takes into account the predicted residuals.

The rate-distortion cost function employed in pre-motion-estimation takes a similar form as for the conventional motion estimation. It will be noted that the pre-motion-estimation rate-distortion cost expression involves the original reference frame, $x_{i-1}$, as indicated below:

$$J_{pre\_me\_min} = \min_{v_i} \|x_i - p'_i(m_i, v_i, x_{i-1})\| + \lambda r_v \quad (4)$$

Residuals resulting from the predicted motion vector selected using Equation (4) relative to the original reference frame ($x_{i-1}$) are then determined. In some embodiments, they may be transformed and quantized to be used as predicted quantized transform domain coefficients in the second stage. It will be understood that the nomenclature "i−1" to indicate the original reference frame does not necessarily mean that the original reference frame is the frame immediately preceding the current frame i in the video sequence, but rather that the original reference frame is a frame previously encoded by the encoder.

The search area within the original reference frame over which Equation (4) is applied may be defined as a preset number of pixels around a pre-prediction motion vector. The pre-prediction motion vector may be selected using any one of a number of initialization processes. For example, the pre-prediction motion vector for a given partition may be based on an average (weighted or not) of other motion vectors already determined for other partitions in the frame or macroblock, i.e. based on spatially-related motion vectors. In some cases, it may be based on one or more motion vectors for a similar partition location in adjacent frame(s), i.e. based on temporally-related motion vectors. In a transcoding context, the pre-prediction motion vector may be selected using related full-resolution motion vectors. Example processes for using full-resolution motion vectors include direct use of downsampled motion vectors in a direct-mappable case, or in non-direct mappable cases the indirect use of two or more downsampled full-resolution motion vectors, such as through averaging, weighted averaging, median, etc.

Howsoever the pre-prediction motion vector is selected, once it is selected it defines a center point in the original reference frame around which a search area is defined, for example based on a preset number of pixels. Within that search area, the encoder evaluates Equation (4) to identify the predicted motion vector having the lowest rate-distortion cost according to the expression in Equation (4). The residuals resulting from the predicted motion vector are then calculated. These are then the "predicted residuals" used in selecting the actual motion vector.

To select the actual motion vector, a modification is made to Equation (2) to create a rate-distortion cost equation that takes into account the distortion and cost associated with the predicted residuals, such as the rate-distortion expression below:

$$J'_{me\_min} = \min \|x_i - (p_i(m_i, v_i, \overline{x_{i-1}}) + z^{-1}z(u'_i, q_i))\| + \lambda r_{v,z} \quad (5)$$

Equation (5) reflects motion estimation cost evaluation taking into account fixed predicted residuals ($z^{-1}z(u'_i, q_i)$). In this expression, the distortion term includes the difference between the partition to-be-encoded $x_i$ and the reference block pinpointed by the motion vector $v_i$ within the reconstructed frame $\overline{x_{i-1}}$ where the reference block is adjusted by the predicted residuals $u'_i$ after they have been transformed, quantized, de-quantized and inverse transformed. The rate term also reflects the encoding cost of not only the motion vector but also the predicted residuals (or, more accurately, the encoding cost of the quantized transformed predicted residuals z).

It will be understood from considering the present description that the residuals term ($z^{-1}z(u'_i, q_i)$) is "fixed" in the sense that it does not change during a search for a desired motion vector $v_i$ within a given search area when performing motion estimation for a particular partition. In this regard, the residuals term is a "prediction" of the residuals based on the "desired residuals" $u'_i$ from the original reference frame using the predicted motion vector, and Equation (5) may lead to the selection of a motion vector $v_i$ that results in a best fit with the predicted residuals $u'_i$. That is, each candidate motion vector $v_i$ points to a particular reference block of pixels in the reference frame. The distortion term in Equation (5) evaluates how well the original partition pixels $x_i$ match with the reconstruction that will be obtained by a decoder, where the reconstruction is the reference block as adjusted by the reconstructed predicted residuals (after they have undergone transform and quantization operations z, and the inverse operations $z^{-1}$). Accordingly, it will be appreciated that the minimum distortion will result when a motion vector $v_i$ points to a reference block that combines with the reconstructed predicted residuals (after quantization, etc.) so as to result in a best match to the original partition pixels. In other words, by using the fixed predicted residuals, the motion vector $v_i$ will be selected based on best fit with the predicted residuals.

Figure 3:
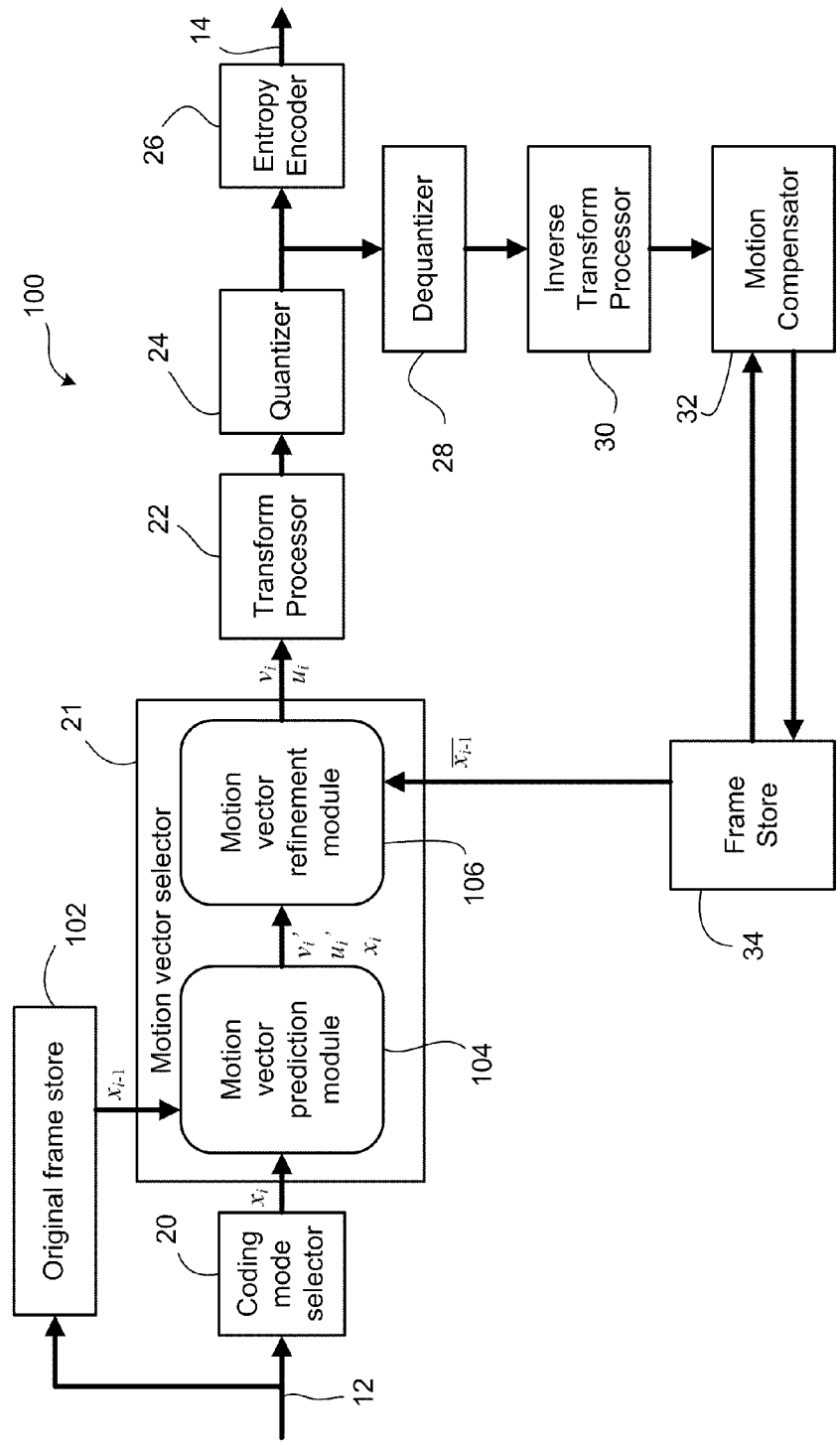
FIG. 3 shows a block diagram of an example encoder employing predicted residuals in motion estimation.

Reference is now made to FIG. 3, which shows an encoder 100 in accordance with the present application. The encoder 100 includes an original frame store 102 for storing copies of original frame for use by the motion vector selector 21 in selecting predicted motion vectors and calculating predicted residuals.

Figure 4:
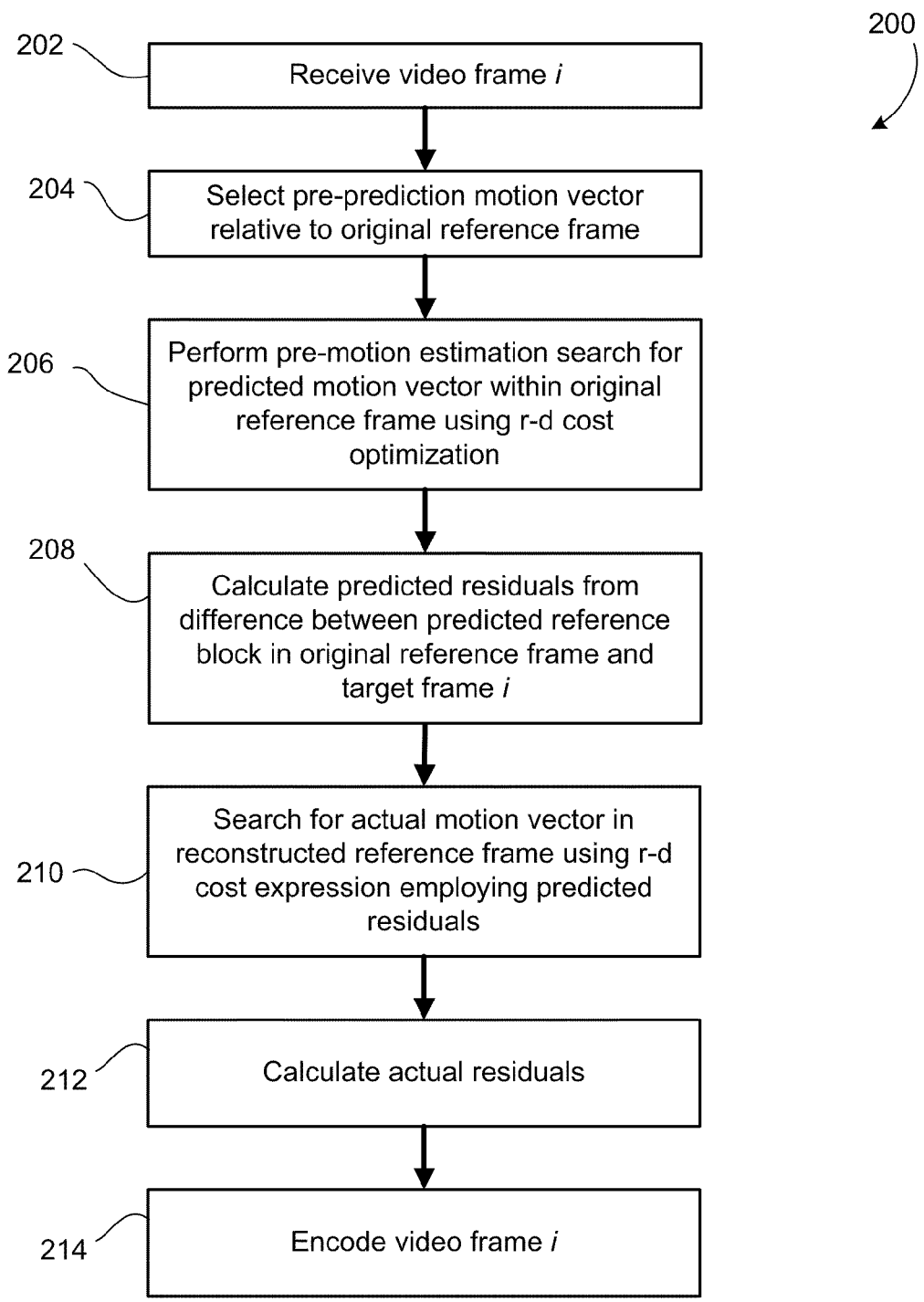
FIG. 4 shows, in flowchart form, an example method of encoding a video that employs predicted residuals during motion estimation.

The motion vector selector 21 includes a motion vector prediction module 104 and a motion vector refinement module 106. Reference will now also be made to FIG. 4, which shows, in flowchart form, an example method 200 of encoding a frame of video in accordance with the present application. The method 200 begins in step 202 with receiving the $i^{th}$ video frame. The motion vector prediction module 104 receives the current frame $x_i$, i.e. the frame to-be-encoded, wherein each macroblock in the frame is partitioned in accordance with a partitioning selected by the coding mode selector 20. It will be appreciated that the coding mode selector 20 may, for various coding modes, partition the macroblocks of frame $x_i$ into different partitions as it searches for an optimal coding mode. In other words, the motion vector selection, etc., may loop multiple times as the coding mode selector evaluates various partitioning of the macroblocks in the frame. It will also be understood that for a given macroblock having a given partitioning, the motion vector selector 21 is tasked with selecting a motion vector for each of the partitions. Some of these details are not further elaborated upon in this simplified example.

For a given partition, the motion vector prediction module 104 selects the pre-prediction motion vector and searches for a predicted motion vector within a search area in an original reference frame $x_{i-1}$, as indicated by steps 204 and 206. The pre-prediction motion vector may be initialized using any one of a variety of techniques, examples of which are mentioned above. The motion vector prediction module 104 may use Equation (4) in step 206 to search for and select the predicted motion vector $v'_i$ from within the search area in the original reference frame $x_{i-1}$. In step 208, it then calculates the predicted residuals $u'_i$ from the difference between the partition to-be-encoded in the current frame $x_i$ and the predicted reference block in the original reference frame $x_{i-1}$ pinpointed by the predicted motion vector $v'_i$.

The motion vector refinement module 106 receives the current frame $x_i$ (or at least the partition to-be-encoded within the current frame), the predicted motion vector $v'_i$, and the predicted residuals $u'_i$ (or, in some embodiments, transformed and quantized predicted residuals $z'_i$). It also has access to the reconstructed reference frame $\overline{x_{i-1}}$ from the frame store 34. The motion vector refinement module 106 then, in step 210, searches for the actual motion vector $v_i$ within the reconstructed reference frame $\overline{x_{i-1}}$. The search may be initiated within a search area that, in one embodiment, is centered around a point in the reconstructed reference frame $\overline{x_{i-1}}$ identified by the predicted motion vector $v'_i$. The search is based on minimization of a rate-distortion cost expression that employs the predicted residuals $u'_i$. Once the actual motion vector $v_i$ is selected, the actual residuals $u_i$ are determined in step 212. Once actual motion vectors v and residuals u for each partition in each macroblock in frame i are selected, the frame may be encoded as shown in step 214.

Those skilled in the art will appreciate that the encoding step 214 may include transform, quantization, and entropy encoding. Moreover, those skilled in the art will appreciate that the illustrated process of selecting actual motion vectors for each partition in a macroblock may be repeated for each coding mode evaluated by the coding mode selector 20 and only the actual motion vectors and residuals corresponding to the optimal partitioning selected by the coding mode selector 20 are eventually encoded as part of the encoded video output by the encoder 100.

It will be understood that the description herein may be extended to apply to more than one original reference frame. In other words, it will be appreciated that in some embodiments the predicted residuals for a given partition may be obtained by using more than one predicted motion vector referencing more than one original reference frame.

Those skilled in the art will understand the various modifications and variations that may be made to the example process described above without departing from the general process of employing predicted residuals from an original reference frame in rate-distortion analysis used for selecting an actual motion vector.

Application to Transcoding

In many instances it is necessary to transcode an encoded video. For example, transcoding may be used to convert an encoded video stream from one encoding format (such as H.264) to another encoding format (such as MPEG2). In another example, transcoding may be used to reduce the frame size of a video—i.e. to spatially downsample the video—in order to have the video playback on a smaller video screen. This can be particularly relevant with modern technology where, for example, videos may be viewed on a mobile device screen, which tends to be relatively small, or videos may be viewed through a relatively small video playback plug-in within a web browser. In many other situations, videos that are originally encoded at a particular frame size may need to be spatially downsampled to create an encoded version of the video at a smaller frame size before being transmitted to an end user for playback. In these situations it may be too costly send the full-resolution encoded video to the end device for downsampling after decoding. Even in the absence of cost concerns, it may be too time consuming or taxing upon the processing resources of an end device to have the end device receive, decode and downsample a full-resolution video as opposed to receiving and decoding a downsampled encoded video. Hence, the importance of transcoding.

In the transcoding context, the "original reference frame" is the decoded and downsampled reference frame. This is the "original reference frame" used for pre-motion-estimation, i.e. to find "predicted residuals" that may then be used in Equation (5) for selecting an actual motion vector.

Encoder Components

Figure 5:
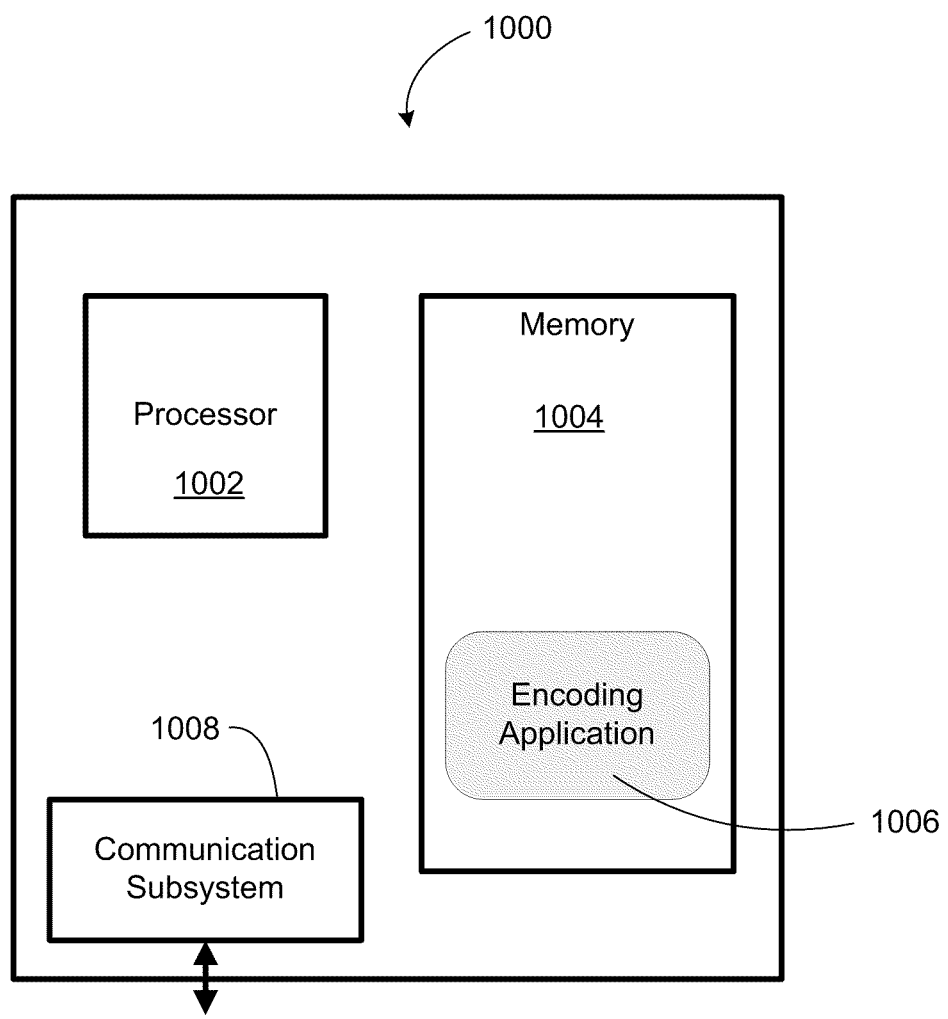
FIG. 5 shows, in block diagram form, an example embodiment of a encoder.

Reference is now also made to FIG. 5, which shows a simplified block diagram of an example embodiment of an encoder 1000. The encoder 1000 includes a processor 1002, a memory 1004, and an encoding application 1006. The encoding application 1006 may include a computer program or application stored in memory 1004 and containing instructions for configuring the processor 1002 to perform steps or operations such as those described herein. For example, the encoding application 1006 may include subcomponents or parts for configuring the processor to encode a video and output an encoded bitstream. The encoding application 1006 may be adapted to implement some or all of the methods and processes described herein to improve the speed, efficiency, and or rate-distortion cost of the encoding.

The encoder 1000 may further include a communications subsystem 1008 for receiving "original" video and for outputting an encoded video. The communications subsystem 1008, in some embodiments, may enable communications with a network, such as the Internet.

It will be understood that the encoding application 1006 and/or its subcomponents or parts may be stored in on a computer readable medium, such as a compact disc, flash memory device, random access memory, hard drive, etc.

It will be appreciated that the encoder according to the present application may be implemented in a number of computing devices, including, without limitation, servers, suitably programmed general purpose computers, set-top television boxes, television broadcast equipment, and mobile devices. The encoder may be implemented by way of software containing instructions for configuring a processor to carry out the functions described herein. The software instructions may be stored on any suitable computer-readable memory, including CDs, RAM, ROM, Flash memory, etc.

It will be understood that the encoder described herein and the module, routine, process, thread, or other software component implementing the described method/process for configuring the encoder and/or any of its subcomponents or parts may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of encoding a video in a video encoder, the video including a plurality of frames including a target frame, the target frame including an inter-coded partition, the method comprising:
    encoding and decoding one of the plurality of frames other than the target frame to produce a reconstructed reference frame;
    selecting a predicted motion vector for the inter-coded partition;
    calculating predicted residual values from the difference between the inter-coded partition and a reference block in said one of the plurality of frames, wherein the reference block is identified by the predicted motion vector; and
    determining an actual motion vector with reference to the reconstructed reference frame using a rate-distortion expression incorporating the predicted residual values
    wherein said selecting the predicted motion vector includes selecting a candidate motion vector that minimizes a rate-distortion cost equation with respect to said one of the plurality of frames within a first search area, wherein the rate-distortion cost equation is:

$$J_{pre\_me\_min} = \min_{v_i} \|x_i - p'_i(m_i, v_i, x_{i-1})\| + \lambda r_v$$

and wherien $v_i$ is the candidate motion vector, $x_i$ is the target frame, $x_{i-1}$ is said one of the plurality of frames, $m_i$ is the coding mode, $r_v$ is the coding rate for the motion vector $v_i$, $\lambda$ is the Lagrangian multiplier, and $p'_i$ is the reference block in said one of the plurality of frames $x_{i-1}$ identified by the motion vector $v_i$.

2. The method claimed in claim 1, wherein the first search area is centered at a first point in said one of the plurality of frames identified by a pre-prediction motion vector, and wherein the method includes initializing the pre-prediction motion vector.

3. The method claimed in claim 2, wherein the pre-prediction motion vector is initialized based on at least one motion vector in an adjacent partition in the target frame.

4. The method claimed in claim 2, wherein the target frame comprises a downsampled video frame, and wherein said one of the plurality of frames comprises a downsampled reference frame, and wherein the pre-prediction motion vector is initialized based on at least one downsampled full-resolution motion vector.

5. The method claimed in claim 1, wherein said determining includes selecting the actual motion vector so as to minimize the rate-distortion expression with respect to the reconstructed reference frame within a second search area.

6. The method claimed in claim 5, wherein said selecting the actual motion vector includes determining reconstructed predicted residual values by transforming and quantizing the predicted residual values to create quantized transform domain coefficients, and dequantizing and inverse transforming the quantized transform domain coefficients to create the reconstructed predicted residual values.

7. A non-transitory computer-readable medium having stored thereon computer-executable instructions which, when executed by a processor, configure the processor to execute the method claimed in claim 1.

8. A method of encoding a video in a video encoder, the video including a plurality of frames including a target frame, the target frame including an inter-coded partition, the method comprising:
    encoding and decoding one of the plurality of frames other than the target frame to produce a reconstructed reference frame;
    selecting a predicted motion vector for the inter-coded partition;
    calculating predicted residual values from the difference between the inter-coded partition and a reference block in said one of the plurality of frames, wherein the reference block is identified by the predicted motion vector; and
    determining an actual motion vector with reference to the reconstructed reference frame so as to minimize a rate-distortion expression that incorporates the predicted residual values after reconstruction, wherein the minimization is within a second search area,
    wherein the reconstructed predicted residual values are determined by transforming and quantizing the predicted residual values to create quantized transform domain coefficients, and dequantizing and inverse transforming the quantized transform domain coefficients to create the reconstructed predicted residual values,
    wherein the rate-distortion expression comprises:

$$J'_{me\_min} = \min \|x_i - (p_i(m_i, v_i, \overline{x_{i-1}}) + z^{-1}z(u'_i, q_i))\| + \lambda r_{v,z}$$

and wherein $v_i$ is the actual motion vector, $x_i$ is the target frame, $\overline{x_{i-1}}$ is the reconstructed reference frame, $m_i$ is the coding mode, $r_{v,z}$ is the coding rate for the motion vector $v_i$ and the quantized transform domain coefficients, $\lambda$ is the Lagrangian multiplier, and $p_i$ is the reference block in the reconstructed reference frame $\overline{x_{i-1}}$ identified by the motion vector $v_i$, and wherein $u'_i$ are the predicted residual values, $q_i$ is the quantization step size, z represents the transform and quantization operations, and is the $z^{-1}$ represents the inverse operations, and wherein the reconstructed predicted residual values are given by $(z^{-1}z(u'_i, q_i))$.

9. The method claimed in claim 1 further comprising calculating actual residual values based on an actual reference block in the reconstructed reference frame, wherein the actual reference block is identified by the actual motion vector.

10. The method claimed in claim 9, further comprising comparing a rate-distortion cost of the actual residual values with a rate-distortion cost of the predicted residual values, and encoding the target frame using the residual values having a smaller rate-distortion cost.

11. The method claimed in claim 1, further comprising:
receiving the target frame,
selecting a coding mode,
repeating the operations of selecting a predicted motion vector, calculating predicted residual values, and determining the actual motion vector, for each inter-coded partition in the target frame, and
encoding the target frame based on the selected coding mode and actual motion vector.

12. An encoder for encoding a video, the video including a plurality of frames including a target frame, the target frame including an inter-coded partition, the encoder comprising:
a processor;
a memory;
a communications system for outputting an encoded video; and
an encoding application stored in memory and containing instructions for configuring the processor to encode the video by
encoding and decoding one of the plurality of frames other than the target frame to produce a reconstructed reference frame;
selecting a predicted motion vector for the inter-coded partition;
calculating predicted residual values from the difference between the inter-coded partition and a reference block in said one of the plurality of frames, wherein the reference block is identified by the predicted motion vector; and
determining an actual motion vector with reference to the reconstructed reference frame using a rate-distortion expression incorporating the predicted residual values
wherein said selecting the predicted motion vector includes selecting a candidate motion vector that minimizes a rate-distortion cost equation with respect to said one of the plurality of frames within a first search area, wherein the rate-distortion cost equation is:

$$J_{pre\_me\_min} = \min_{v_i} \|x_i - p'_i(m_i, v_i, x_{i-1})\| + \lambda r_v$$

and wherien $v_i$ is the candidate motion vector, $x_i$ is the target frame, $x_{i-1}$ is said one of the plurality of frames, $m_i$ is the coding mode, $r_v$ is the coding rate for the motion vector $v_i$, $\lambda$ is the Lagrangian multiplier, and $p'_i$ is the reference block in said one of the plurality of frames $x_{i-1}$ identified by the motion vector $v_i$.

13. The encoder claimed in claim 12, wherein the first search area is centered at a first point in said one of the plurality of frames identified by a pre-prediction motion vector, and wherein the encoding application further configures the processor to initialize the pre-prediction motion vector.

14. The encoder claimed in claim 13, wherein the pre-prediction motion vector is initialized based on at least one motion vector in an adjacent partition in the target frame.

15. The encoder claimed in claim 13, wherein the target frame comprises a downsampled video frame, and wherein said one of the plurality of frames comprises a downsampled reference frame, and wherein the pre-prediction motion vector is initialized based on at least one downsampled full-resolution motion vector.

16. The encoder claimed in claim 12, wherein the encoding application is configured to determine the actual motion vector by configuring the processor to select the actual motion vector so as to minimize the rate-distortion expression with respect to the reconstructed reference frame within a second search area.

17. The encoder claimed in claim 16, wherein the encoding application further configures the processor to select the actual motion vector by determining the reconstructed predicted residual values by transforming and quantizing the predicted residual values to create quantized transform domain coefficients, and dequantizing and inverse transforming the quantized transform domain coefficients to create the reconstructed predicted residual values.

18. The encoder claimed in claim 12, wherein the encoding application further configures the processor to calculate actual residual values based on an actual reference block in the reconstructed reference frame, and wherein the actual reference block is identified by the actual motion vector.

19. The encoder claimed in claim 18, wherein the encoding application further configures the processor to compare a rate-distortion cost of the actual residual values with a rate-distortion cost of the predicted residual values, and encode the target frame using the residual values having a smaller rate-distortion cost.

20. The encoder claimed in claim 12, wherein the encoding application further configures the processor to:
receive the target frame,
select a coding mode,
repeat the operations of selecting a predicted motion vector, calculating predicted residual values, and determining the actual motion vector, for each partition in the target frame, and
encode the target frame based on the selected coding mode and actual motion vector.

21. An encoder for encoding a video, the video including a plurality of frames including a target frame, the target frame including an inter-coded partition, the encoder comprising:
a processor;
a memory;
a communications system for outputting an encoded video; and
an encoding application stored in memory and containing instructions for configuring the processor to encode the video by
encoding and decoding one of the plurality of frames other than the target frame to produce a reconstructed reference frame;
selecting a predicted motion vector for the inter-coded partition;
calculating predicted residual values from the difference between the inter-coded partition and a reference block in said one of the plurality of frames, wherein the reference block is identified by the predicted motion vector; and
determining an actual motion vector with reference to the reconstructed reference frame using a rate-distortion expression incorporating the predicted residual values,
wherein said selecting the predicted motion vector includes selecting a candidate motion vector that minimizes a rate-distortion cost equation with respect to said one of the plurality of frames within a first search area, wherein the rate-distortion expression comprises:

$$J'_{me\_min} = \min \|x_i - (p_i(m_i, v_i, \overline{x_{i-1}}) + z^{-1}z(u'_i, q_i))\| + \lambda r_{v,z}$$

wherein $v_i$ is the actual motion vector, $x_i$ is the target frame, $\overline{x_{i-1}}$ is the reconstructed reference frame, $m_i$ is the coding mode, $r_{v,z}$ is the coding rate for the motion vector $v_i$ and the quantized transform domain coefficients, $\lambda$ is the Lagrangian multiplier, and $p_i$ is the reference block in the reconstructed reference frame $\overline{x_{i-1}}$ identified by the motion vector $v_i$, and wherein $u'_i$ are the predicted residual values, $q_i$ is the quantization step size, z represents the transform and quantization operations, and is the $z^{-1}$ represents the inverse operations, and wherein the reconstructed predicted residual values are given by $((z^{-1}z(u'_i, q_i))$.

* * * * *